United States Patent [19]
Ruehle et al.

[11] Patent Number: 6,095,001
[45] Date of Patent: Aug. 1, 2000

[54] MOTOR VEHICLE STEPPED TRANSMISSION

[75] Inventors: Guenter Ruehle, Loechgau; Martin Seufert, Leonberg, both of Germany

[73] Assignee: Getrag Getriebe-und Zahnradfabrik Hermann Hagenmeyer GmbH & Cie., Ludwigsburg, Germany

[21] Appl. No.: 09/235,953

[22] Filed: Jan. 22, 1999

[30]     Foreign Application Priority Data

Jan. 26, 1998 [DE] Germany ............................ 198 02 820

[51] Int. Cl.$^7$ ..................................................... F16H 3/093
[52] U.S. Cl. ............................................... 74/331; 74/339
[58] Field of Search ............................. 74/325, 329, 331, 74/333, 339, 340

[56]             References Cited

U.S. PATENT DOCUMENTS

| | | | |
|---|---|---|---|
| 2,599,801 | 6/1952 | Youngren et al. .......................... | 74/331 |
| 4,463,621 | 8/1984 | Fisher ........................................ | 74/330 |
| 4,957,016 | 9/1990 | Amedei et al. ........................ | 74/340 X |
| 5,125,282 | 6/1992 | Bender et al. .......................... | 74/333 X |
| 5,181,431 | 1/1993 | Zaiser et al. ............................... | 74/333 |
| 5,603,242 | 2/1997 | Krieger ..................................... | 74/339 |
| 5,720,203 | 2/1998 | Honda et al. .............................. | 74/325 |
| 5,890,392 | 4/1999 | Ludanek et al. ........................... | 74/331 |

FOREIGN PATENT DOCUMENTS

| | | |
|---|---|---|
| 27129355 | 4/1995 | France . |
| PS 967 545 | 11/1957 | Germany . |
| PS 31 31 139 | 2/1983 | Germany . |
| OS 38 12 359 | 7/1989 | Germany . |
| OS 40 31 851 | 4/1992 | Germany . |
| OS 44 01 812 | 8/1994 | Germany . |
| OS 195 48 622 | 5/1997 | Germany . |
| WO 92/04558 | 3/1992 | WIPO . |
| WO 97/33103 | 9/1997 | WIPO . |

*Primary Examiner*—Sherry L. Estremsky
*Attorney, Agent, or Firm*—Shook, Hardy & Bacon L.L.P.

[57]             ABSTRACT

A motor vehicle stepped transmission comprises a transmission input shaft which is driven by an engine output shaft via a separating clutch. Further, it comprises a transmission output shaft arranged colinearly with the transmission input shaft. A countershaft is arranged parallel to the transmission output shaft. A plurality of gearwheel sets is provided for establishing forward and reverse gears within the transmission. A sub-plurality of the gearwheel sets each comprises a loose wheel. The loose wheels are rotatably arranged on a shaft and are adapted to be rigidly connected to the shaft by means of a gearshift clutch for shifting into one of a sub-plurality of the forward and reverse gears. Another of the gearwheel sets is associated to another of the forward and reverse gears and is adapted to be switched by means of a friction clutch. A toothed wheel within the other gearwheel set and associated to the other gear is arranged on an additional shaft extending parallel to the transmission output shaft. Means are provided for establishing a torque-transmitting connection from the engine output shaft to the other gearwheel set via the friction clutch. Thus, a gearshift jolt is reduced when shifting from one gear to another. The friction clutch is adapted to be closed when one of the gearshift clutches is activated.

17 Claims, 4 Drawing Sheets

MOTOR VEHICLE STEPPED TRANSMISSION

FIELD OF THE INVENTION

The invention, generally, relates to the field of transmissions, in particular to motor vehicle stepped transmissions, also referred to as stickshift transmissions.

Still more specifically, the invention relates to a motor vehicles stepped transmission, comprising a transmission input shaft being driven by an engine output shaft via a separating clutch, a transmission output shaft arranged colinearly with the transmission input shaft and a countershaft arranged parallel to the transmission output shaft. A plurality of gearwheel sets is provided for establishing forward and reverse gears (1., 2., 3., 4., 5., 6., R) within the transmission. A sub-plurality of the gearwheel sets each comprises a loose wheel, the loose wheels being rotatably arranged on a shaft and being adapted to be rigidly connected to the shaft by means of a gearshift clutch for shifting into one of a sub-plurality of the forward and reverse gears (1., 3., 4., 5., 6., R). Another of the gearwheel sets is associated to another of the forward and reverse gears (2.) and is adapted to be switched by means of a friction clutch. For reducing a gearshift jolt when shifting from one gear to another, the friction clutch is adapted to be closed when one of the gearshift clutches is activated.

BACKGROUND OF THE INVENTION

In motor vehicle transmissions one distinguishes between so-called power-shift transmissions on the one hand side being transmissions having an uninterrupted flow of torque during gearshift and transmissions having an interrupted flow of torque during gearshift on the other hand side. Power-shift transmissions are mostly configured as planetary transmissions having a hydrodynamic torque converter at their input. By actuating clutches and brakes for the various elements within the planetary gear trains the various gears of such a power-shift transmission are actuated in an overlapping relationship so that during a gear change no interruption of torque occurs between the driving engine and the vehicle wheels.

In transmissions having an interrupted flow of torque, for example in conventional stepped motor vehicle transmissions of the countershaft type, the flow of torque is first interrupted during each gearshift when the old gear is separated and is then again closed when the new gear is engaged so that an interruption of the driving force occurs during such a gearshift. This interruption of driving force results in a so-called gearshift jolt which is disturbing is particular during upshift from a low gear to a higher gear because in such a situation the vehicle effects a pitch movement as a consequence of the drive force interruption.

In the course of the automatization of stickshift transmissions with interrupted drive force one has attempted to reduce the gearshift jolt by using two concentrically arranged and structurally integrated friction clutches for overlappingly connecting a first and a second group of gears of the transmission, respectively, with the output of the drive engine. Such transmissions are referred to in the art as "double clutch transmissions" or "twin clutch transmissions". An example of a double clutch transmission of the afore-mentioned kind is discussed in German disclosure document 38 12 359.

Other double clutch transmissions of similar type are described in German disclosure document DE 44 01 812, DE 40 31 851 or in German patent specifications DE 195 48 622 and DE 31 31 139.

In these prior art transmissions the double clutch is configured as a component having a coaxial arrangement of the two clutches in one common clutch housing, however, the function is slightly different as compared to the basic principle of double clutch transmissions discussed further above. In these transmissions one of the friction clutches of the double clutch is used for engaging the respective highest gear, for example the sixth gear (DE 44 01 812) during each gearshift. As a consequence a certain torque-transmitting connection remains via the highest gear during all other gearshift operations in contrast to conventional stepped transmissions with drive force interruption where the flow of torque is entirely interrupted between the engine and the transmission output during gearshift.

In this type of transmissions the gearshift jolt is slightly reduced, however, the limited gain in comfort that may be achieved with such transmissions does not justify the substantial structural complications within the transmission.

Furthermore, transmissions of this type have the systematic disadvantage that only the smallest available torque, namely the torque associated to the highest gear, may be coupled to the output. During upshift from first to second gear, where the greatest losses in comfort occur due to gearshift jolts, only minimal gains in comfort may be achieved because the sudden reduction in drive force in first gear may only be reduced to an extremely small extent. Only during upshift in still higher gears the continuing involvement of the highest gear during gearshift becomes more and more effective, however, in such upshift operations in higher gears the gearshift jolt problem is of much lesser importance.

Moreover, these prior transmissions have the disadvantage that for effecting the desired torque bypass via the highest gear the clutch for the highest gear must operate in slip-operation during the entire gearshift. When the vehicle is used in a mode of operation with numerous gearshifts, for example when it is used within urban traffic, this results in substantial wear of the friction clutch and, accordingly, to a significantly reduced clutch lifetime. This holds true in particular because the differential revolution in the slip-operated clutch of the highest gear is the higher, the lower the involved lower gear is and becomes small only when upshifting into higher gears. In urban traffic, however, one mostly shifts between lower gears, for example when starting at an intersection or at a traffic light so that driving in urban traffic has a negative impact on the wear and the lifetime of the highest gear clutch.

German patent specification 38 12 327 describes a double clutch transmission where the first of the two clutches engages the first gear and the other clutch engages the second gear. In this prior art transmission both clutches may be closed simultaneously and the vehicle may be started with both the first and the second gear engaged. As soon as the revolutions in the two clutches are equal, the flow of force through the first gear clutch is interrupted, for example by means of a freewheel. By doing so, the power dissipated during extreme starting operations, for example on steeply ascending roads may be distributed on both clutches.

It is, therefore, an object underlying the invention to improve a stepped transmission of the kind mentioned at the outset such that a substantial improvement in comfort is achieved in the lowest gears which are of particular importance with respect to the gearshift jolt phenomenon. It is, further, an object of the invention to obtain such a transmission with the littlemost engineering efforts and without any losses in transmission lifetime.

SUMMARY OF THE INVENTION

In a transmission as mentioned at the outset these and other objects are achieved by providing a toothed wheel within the other gearwheel set associated to the other gear, the toothed wheel being arranged on an additional shaft extending parallel to the transmission output shaft, means being provided for establishing a torque-transmitting connection from the engine output shaft to the other gearwheel set via the friction clutch.

The object underlying the invention is thus entirely solved.

By providing a second path for the torque distribution from the engine, the engineer is free to further specify the transmission. This is true both with respect to the particular friction clutch used which must not necessarily by a component of a conventional double clutch, but also with respect to the selection and the positioning of the gear into which the branched torque is guided from the transmission input. It is, thus, possible to advantageously start from unmodified standard transmissions and to add simply some additional components.

In a particularly preferred embodiment of the invention the other gear is the second forward gear.

This feature obviates the disadvantages of the prior art technology as discussed above in detail because when engaging the second forward gear during a gearshift operation, a substantial portion of the torque is guided via that gear so that the gearshift jolt is thus drastically reduced. Furthermore, by providing a friction clutch within the flow of force or the flow of torque, respectively, of the second forward gear, it is possible to switch between the lower gears almost as in a power-shift transmission, i.e. without any interruption of drive force although the lowest gears are the gears which are most sensible with respect to gearshift jolts.

As already mentioned above, the friction clutch may as well be configured conventionally as a part of a double clutch and may be structurally integrated with a conventional separation clutch in the transmission input. As an alternative, it is, however, possible to arrange the friction clutch on an additional shaft and to use same for connecting a toothed wheel of the gearwheel set of the other gear configured as a loose wheel rotatably arranged on the additional shaft.

This measure has the advantage that the transmission input need not be modified at all because the conventional separation clutch in the transmission input remains unaltered. It is only necessary to provide a torque-transmitting connection between the engine output shaft and the additional shaft, for example by means of a conventional gearwheel set. As the friction clutch in that case is arranged on the additional shaft, one is almost entirely free with respect to its structural design.

In another preferred group of embodiments of the invention the other gearwheel set of the other gear comprises a toothed wheel configured as a loose wheel arranged rotatably on the additional shaft, a clutch being provided for connecting the toothed wheel with the additional shaft. As an alternative, the clutch may be a conventional gearshift clutch actuated by means of a shift sleeve or may also be configured as a friction clutch.

This measure has the advantage that the elements of the additional torque path, i.e. the elements running on the additional shaft are entirely decoupled when not utilized for a gearshift operation, so that they do not rotate at high revolutional speed. By doing so, a premature wear of the friction clutch is avoided because the latter is only used during gearshift operations and, of course, only if the associated gear is engaged.

In further embodiments of the invention all of the loose wheels are arranged on the transmission output shaft.

This measure has the advantage that simple conventional design principles may be used.

In that case it is preferred when the toothed wheel of the other gearwheel set of the other gear is configured as a fixed wheel on the transmission output shaft. In particular, the gearwheel sets of the gears may then be arranged in a sequence fifth-sixth-second-fourth-third-first-reverse, as viewed from the transmission input shaft.

This measure has the advantage that a particular useful arrangement of the various gears is obtained.

In an alternative, other embodiments of the invention may be configured so that a first plurality of the loose wheels is arranged on the transmission output shaft whereas a second plurality of the loose wheels is arranged on the countershaft.

This measure has the advantage that it is possible to obtain a still more compact transmission design because the shift sleeve assemblies requiring substantial space are distributed on the transmission output shaft and the countershaft.

The two afore-mentioned embodiments of the transmissions of course necessitate a correspondingly different distribution of gearshift rods and gearshift forks as well as of any servoactuators which might be used on connection therewith.

In a second group of embodiments the arrangement is preferably such that the gearwheel sets of the other gear and one of the sub-plurality of gears have one toothed wheel in common. This common toothed wheel is preferably arranged on the transmission output shaft and is, still more preferably, configured as a fixed wheel.

This measure has the advantage that the corresponding transmission has one gearwheel set plane less as compared to other transmissions so that the axial transmission length is correspondingly reduced.

In that case it is preferred when the gearwheel sets of the gears are arranged in a sequence fifth-sixth-second/third-fourth-first-reverse, as viewed from the transmission input shaft.

Finally, it is preferred if for starting the vehicle from standstill the clutches associated to the first and the second forward gear are adapted to be activated simultaneously, as known per se.

Further advantages will become apparent from the description and the enclosed drawing.

It goes without saying that the afore-mentioned features as well as the features that will be discussed hereinafter may not only be used in the particularly given combination but also in other combinations or alone without leaving the scope of the present invention.

BRIEF DESCRIPTION OF THE DRAWINGS

Embodiments of the invention are shown in the drawings and will be explained in further detail in the subsequent description.

DETAILED DESCRIPTION OF THE PREFERRED EMBODIMENTS

Figure 1:
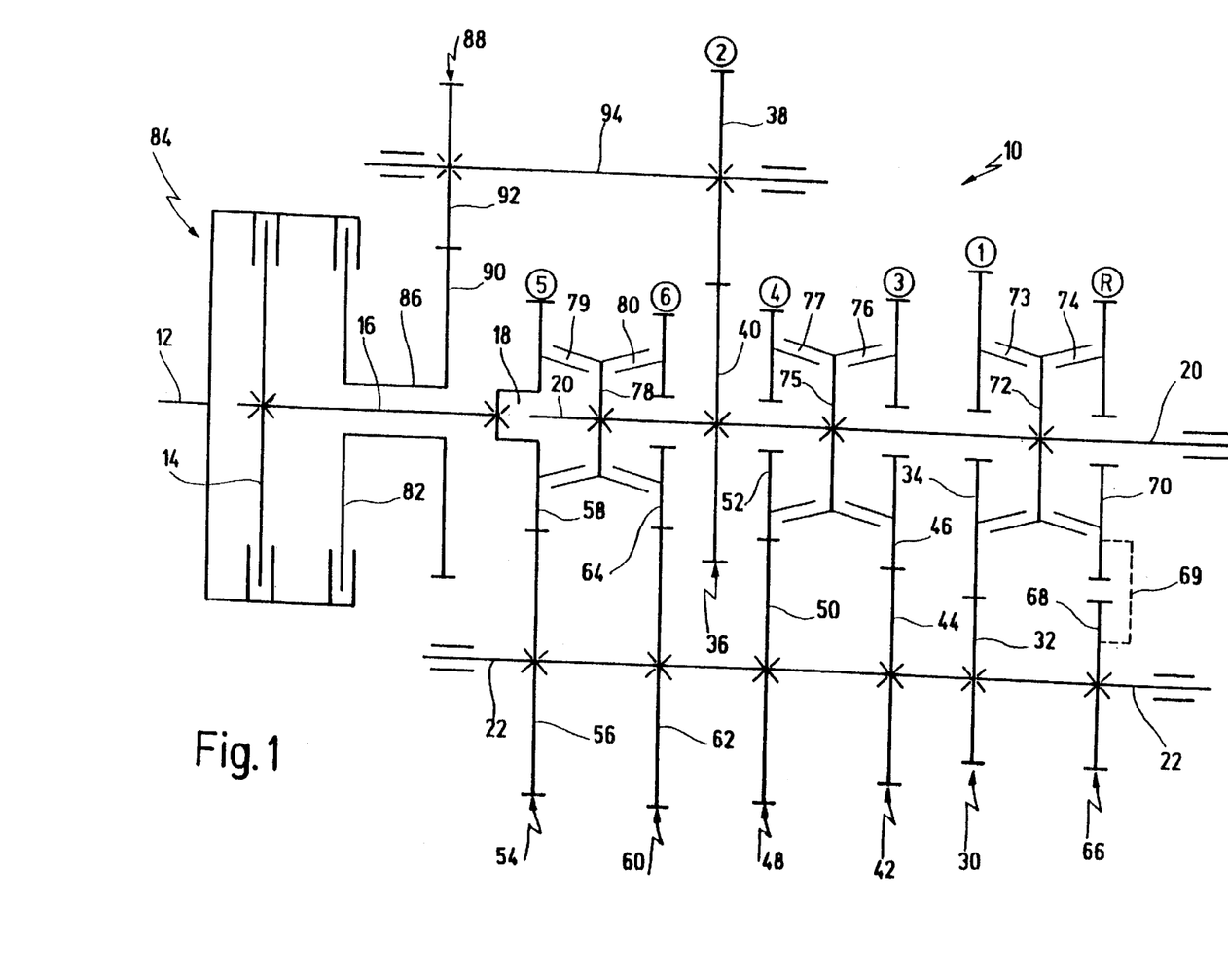
FIG. 1 shows a schematic depiction of a transmission of a first embodiment of a motor vehicle stepped transmission according to the invention.

In FIG. 1 reference numeral 10 as a whole indicates an embodiment of a motor vehicle stepped transmission according to the present invention. In transmission 10 reference numeral 12 indicates an engine output shaft being connected with a transmission input shaft 16 at the transmission input via a conventional separating clutch 14. Transmission input shaft 16 is provided with a bearing 18 on its right hand terminal end in FIG. 1, bearing 18 receiving a terminal end of transmission output shaft 20 which, hence, extends colinearly to transmission input shaft 16 and as an extension thereof. A countershaft 20 is arranged parallel to transmission output shaft 20. Insofar, transmission 10 is a countershaft-type transmission of conventional design.

Transmission output shaft 20 and countershaft 22, respectively, support a first gearwheel set 30 for the first forward gear comprising toothed wheels 32 and 34. A second gearwheel set 36 for the second forward gear is configured by toothed wheels 38 and 40. A third gearwheel set 42 comprising toothed wheels 44 and 46 is likewise arranged on transmission output shaft 20 and countershaft 22, respectively, for the third forward gear. The same applies to a fourth gearwheel set 48 for the fourth forward gear comprising toothed wheels 50 and 52, a fifth gearwheel set 54 for the fifth forward gear comprising toothed wheel 56 and 58, a sixth gearwheel set 60 for the sixth forward gear comprising toothed wheels 62 and 64 and, finally, a seventh gearwheel set 66 for the reverse gear comprising a toothed wheel 68, an inversion wheel 69 and a toothed wheel 70.

Toothed wheels 34, 46, 52, 58, 64 and 70 are configured as so-called loose wheels, which means that they are rotatably arranged on transmission output shaft 20, whereas toothed wheels 32, 44, 50, 56, 62 and 66 are configured as so-called fixed wheels, i.e. wheels which are rigidly connected to countershaft 22 for rotation therewith.

For shifting into first gear or reverse gear, respectively, a first shift sleeve 72 with conventional gearshift clutches 73 and 74 is provided. For shifting into third and fourth gear, a second shift sleeve 75 with gearshift clutches 76 and 77 is provided. For shifting into fifth and sixth gear, respectively, a third shift sleeve 78 with gearshift clutches 79 and 80 is also provided.

As one can further take from FIG. 1, a friction clutch 82 is arranged concentrically to and axially next to separation clutch 14, clutches 14 and 82 being integrated structurally so as to form a double or twin clutch 84. Friction clutch 82 is connected to a hollow shaft 86 surrounding transmission input shaft 16 coaxially. An eighth gearwheel set 88 comprising toothed wheels 90 and 92 connects hollows shaft 86 to an additional shaft 94 extending parallel to shafts 12, 16 and 22. Additional shaft 94 carries toothed wheel 38 of second gearwheel set 36 as a fixed wheel for the second gear while the other toothed wheel 40 of second gearwheel set 36 is arranged as a fixed wheel on transmission output shaft 20.

Stepped transmission 10 of FIG. 1 operates as follows:

For starting the motor vehicle from standstill one first actuates first shift sleeve 72 for closing first gearshift clutch 73 for rigidly connecting toothed wheel 34 of first gearwheel set 30, being configured as a loose wheel, rigidly with transmission output shaft 20. By slowing closing separation clutch 14 the drive torque from the engine is guided from engine output shaft 12 via separation clutch 14 on transmission input shaft 16 and, therefrom, via fifth gearwheel set 54 on countershaft 22 and, therefrom via first gearwheel set 30 to transmission output shaft 20.

If now an upshift is effected from first gear to second gear, friction clutch 82 is closed. By doing so the torque is overlappingly transferred from separation clutch 14 to friction clutch 82. At a predetermined moment in time the torque path of the first gear is in an idle condition, i.e. without any load due to the prevailing revolutions so that the first gear may again be disengaged by shifting first shift sleeve 72 and opening first gearshift clutch 73. Correspondingly, when upshifting from second to third gear by shifting second shift sleeve 75, third gearshift clutch 76 is closed and, simultaneously, separation clutch 14 is again closed. By doing so, the torque path of the second gear comes into an idle condition so that friction clutch 82 may be opened again.

Seen as a whole, power shift operations from first to second, from second to third, from third to second and from second to first gear may be made and the generation of a gearshift jolt may be entirely avoided. The differential revolutions occurring are very small so that there is only a negligible wear in view of the minimum power loss. The clutches and shift sleeves involved may, hence, be easily actuated.

As an alternative, one may start the vehicle from standstill by closing clutches 14 and 82 for first and second gear simultaneously. By subsequently opening one of the two clutches 14 or 82 one may either continue to drive in first gear or may shift up into second gear and continue to drive therein.

For engaging the other gears, namely the higher gears 4., 5. and 6. as well as reverse gear, an interruption in driving force occurs as in conventional transmissions. However, the associated gearshift jolt is very small during these shift operations because the transmitted torques are correspondingly low.

It goes without saying that the branching of the torque via additional shaft 94 must not necessarily involve the second gear as shown in FIG. 1. The branched path for the moment may in a sixth gear transmission also be directed to the third, fourth or fifth gear, depending on how the transmission ratios or the drive train as a whole are configured.

If, for example, the additional path is not directed to the second gear, as shown in FIG. 1, but to the third gear instead, friction clutch 82 may be held in slip condition when upshifting from first to second gear so that by subjecting the transmission with the torque flowing via the additional path the gearshift jolt may at least be drastically reduced. Considering that the additional path is directed to the third gear, i.e. a lower gear in a sixth gear transmission, a substantially more effective reduction of the gearshift jolt may be expected as compared to the prior art discussed at the outset. Moreover, as compared to the prior art the slip revolution in this case is smaller and, hence, the power loss and the generation of heat as well as the wear are also reduced. The shift operations from second to third, from third to fourth, from fourth back to third and from third back to second gear may in that case be effected as power shift operations. The shift operations from fourth up to fifth, from fifth up to sixth, from sixth back again to fifth and from fifth down to fourth are, in contrast, effected as operations with interruption of drive force in this case.

Figure 2:
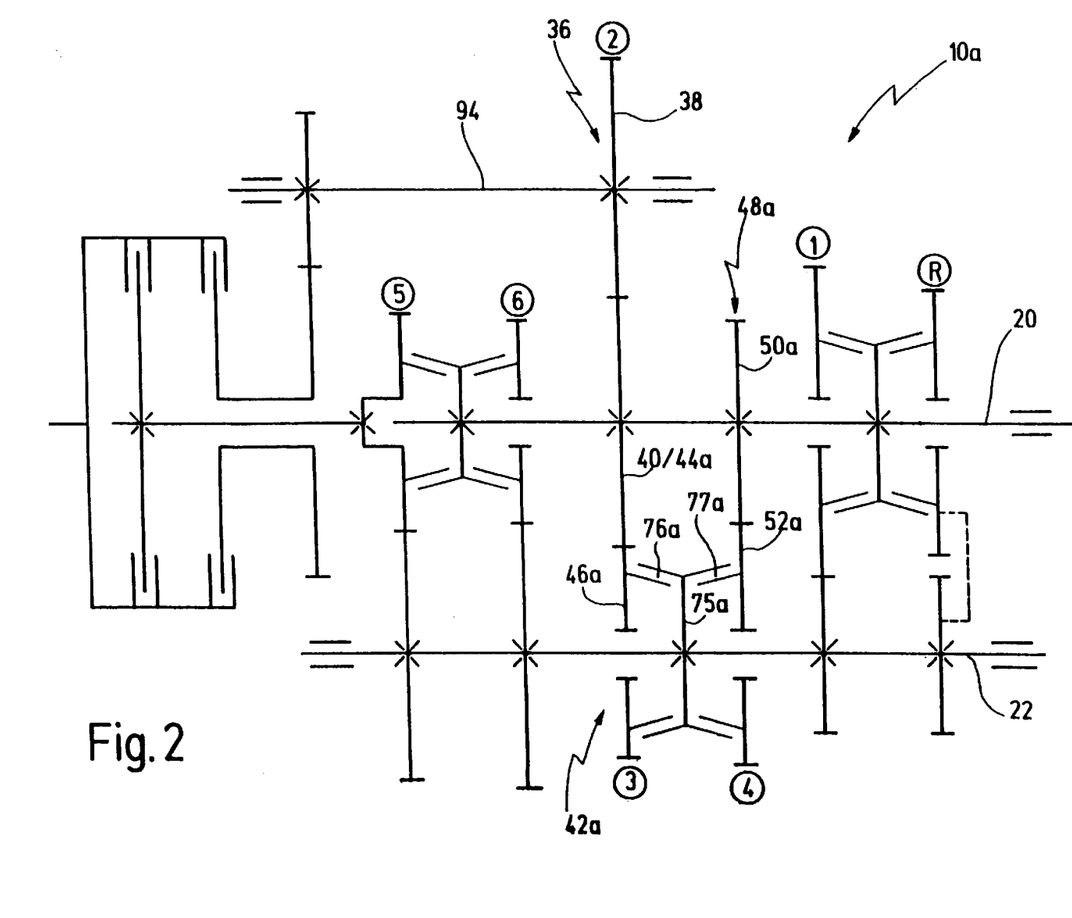
FIG. 2 is an illustration simpler to that of FIG. 1, however, for a second embodiment of the invention.

In a modified embodiment of the transmission as indicated by reference numeral 10a in FIG. 2 the design is altered insofar as the loose wheels 46a for the third gear and 52a for the fourth gear are now arranged on countershaft 22 carrying also second shift sleeve 75a with its gearshift clutches 76a and 77a. A further distinction is that the third gearwheel set 42a for the third gear is now located within the same gearwheel set plane as second gearwheel set 36 for the second gear. In this case transmission output shaft 20 carries a toothed wheel 40/44a configured as a fixed wheel which, as a common toothed wheel is associated both to second gearwheel set 36 as well as to third gearwheel set 42. Fourth gearwheel set 48a with its toothed wheels 50a and 52a for the fourth gear is not modified, disregarding that the positions of toothed wheels 50a and 52a on transmission output shaft 20 and on countershaft 22 are exchanged. Transmission 20a of FIG. 2, hence, has a smaller axial length because it has one gearwheel set plane less as compared with the embodiment of FIG. 1. However, in this case the shift sleeves with their associated actuators (shift forks, shift rods, servoactuators) are distributed on two shafts.

Figure 3:
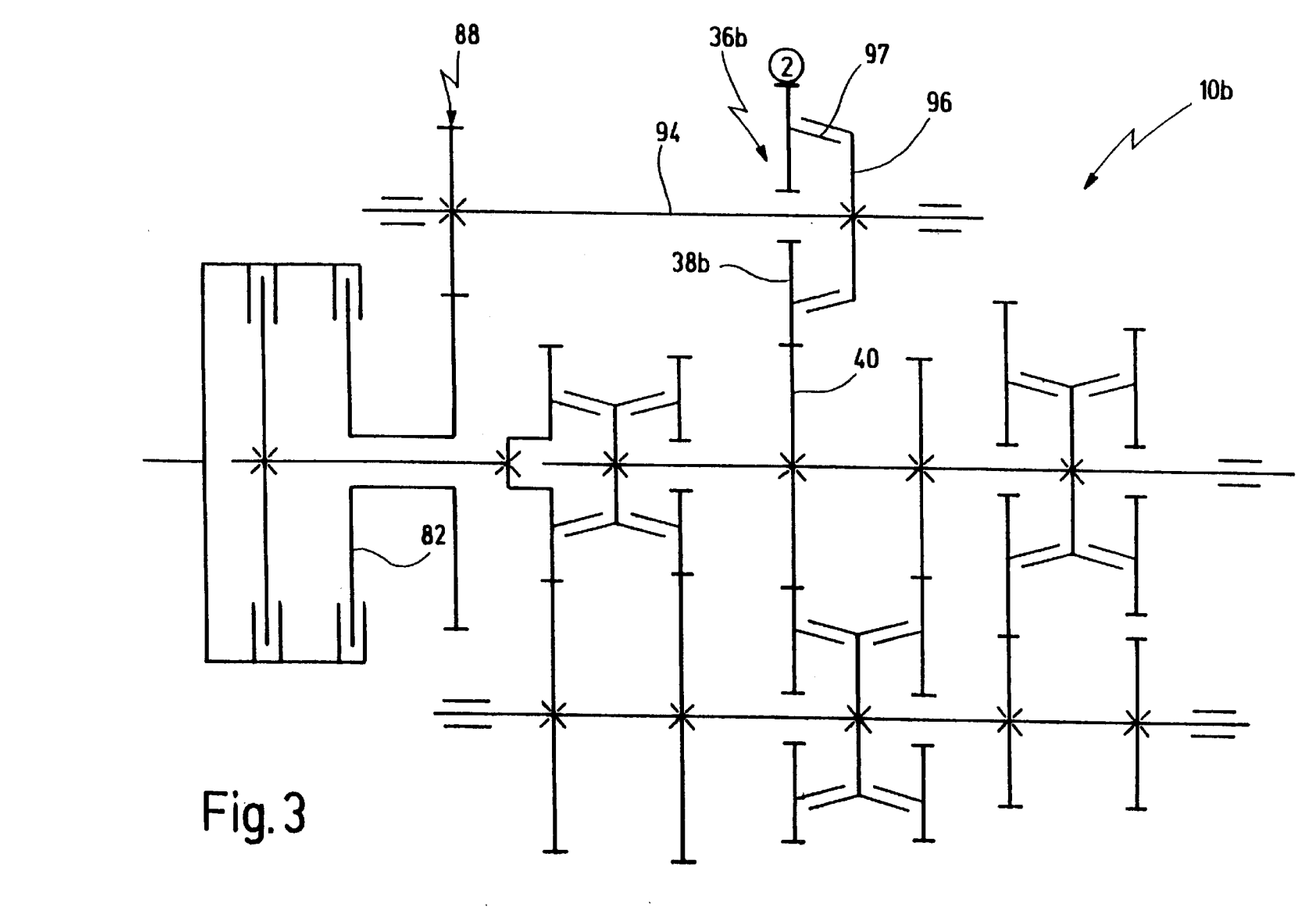
FIG. 3 is an illustration simpler to that of FIG. 1, however, for a third embodiment of the invention.

In a third embodiment of a stepped transmission 10b shown in FIG. 3 one starts from the transmission design of FIG. 2. A further distinction in transmission 10b is that the toothed wheel 38b of the second gearwheel set 36b for the second gear is configured as a loose wheel and is arranged on additional shaft 94. For rigidly connecting toothed wheel 38b with additional shaft 94 a fourth shift sleeve 96 with a gearshift clutch 97 is provided. This design may be chosen with high revolutional speeds shall be avoided as may occur in lower gears when designing the path from friction clutch 82. For, if gearshift clutch 97 is opened, only toothed wheel 38b is driven whereas additional shaft 94 idles and, so does friction clutch 82 driven by additional shaft 94 via eighth gearwheel set 88.

It goes without saying that instead of shift sleeve 96 with gearshift clutch 97 a corresponding three-wheel may be provided which should also be switchable.

Figure 4:
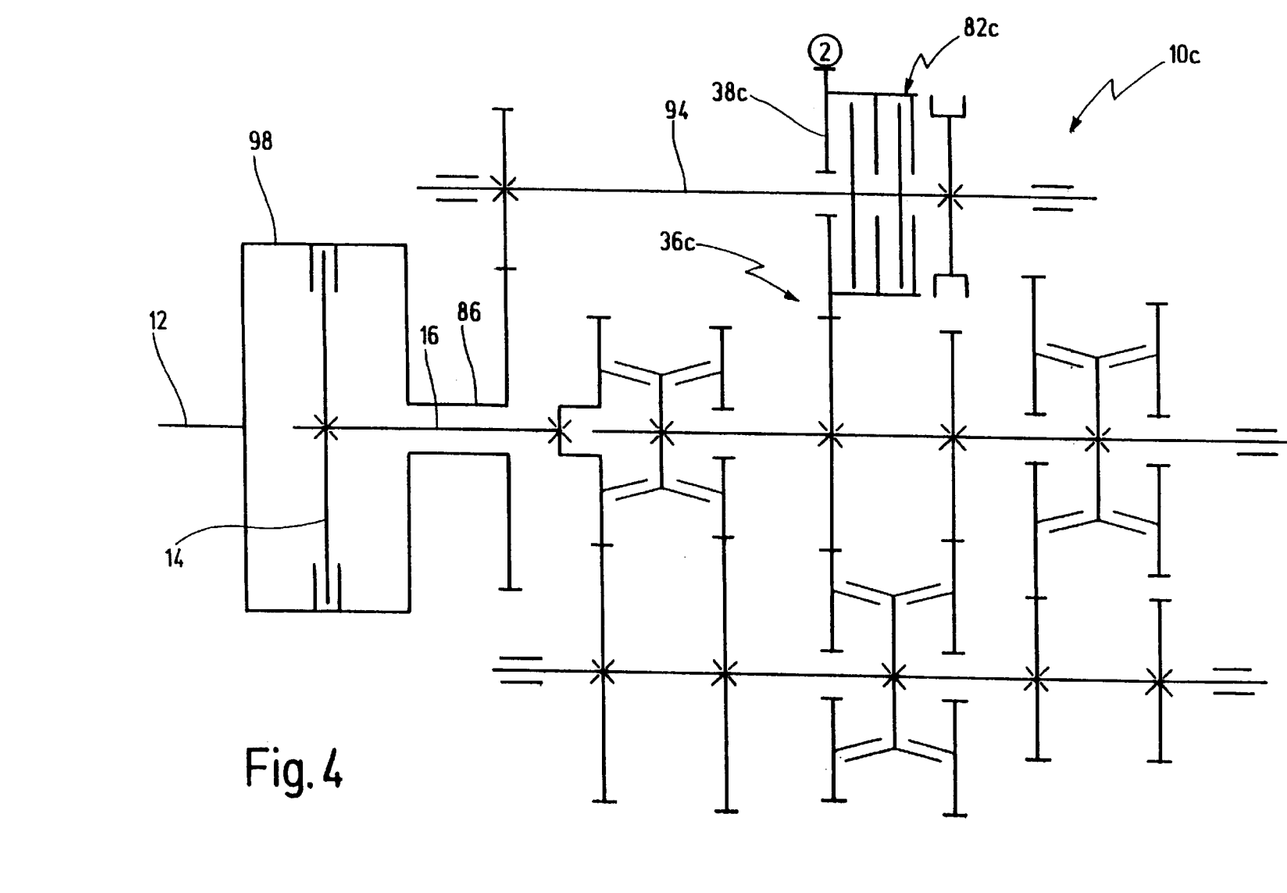
FIG. 4 is an illustration simpler to that of FIG. 1, however, for a fourth embodiment of the invention.

Finally, FIG. 4 shows a fourth embodiment 10c of such a transmission, the configuration of which corresponds basically to that of the transmissions shown in FIGS. 2 and 3. Transmission 10c insofar distinguishes over the transmissions of FIGS. 2 and 3 as follows:

First, toothed wheel 38c of second gearwheel set 36c for the second gear is again configured as a loose wheel on additional shaft 94. For rigidly connecting toothed wheel 38c with additional shaft 94 a friction clutch 82c is used which was transferred from the transmission input to this position in this embodiment 10c of a transmission shown in FIG. 4. As a consequence in this embodiment 10c separating clutch 14 is configured as a conventional single clutch which only connects the clutch housing 98 which rotates together with engine output shaft 12 with hollow shaft 86.

Above that the function of transmission 10c according to FIG. 4 corresponds to that of transmission 10 of FIG. 1.

It goes without saying that the actuating elements for the clutches and the shift sleeves shown in the Figures may be designed hydraulically, pneumatically, electromechanically, electromagnetically or otherwise as servodrives. Moreover, the transmission may be configured in conventional axial design with respect to the vehicle axis or may be of the modern front-transverse type.

What is claimed is:

1. A motor vehicle stepped transmission, comprising:
   a transmission input shaft being driven by an engine output shaft via a separating clutch;
   a transmission output shaft arranged colinearly with said transmission input shaft;
   a countershaft arranged parallel to said transmission output shaft;
   a plurality of gearwheel sets for establishing forward and reverse gears within said transmission;
   a sub-plurality of said gearwheel sets, each set comprising a loose wheel, each of said loose wheels being rotatably arranged on one of said countershaft and said output shaft and being adapted to be rigidly connected to said one of said countershaft and said output shaft by means of a gearshift clutch, for shifting into one of a sub-plurality of said forward and reverse gears, whereas another single one of said gearwheel sets is associated to another single one of said forward and reverse gears and being adapted to be switched by means of a friction clutch, a toothed wheel within said single other gearwheel set associated to said single other gear being arranged on an additional shaft extending parallel to said transmission output shaft, means being provided for establishing a torque-transmitting connection from said engine output shaft to said single other gearwheel set via said friction clutch,
   wherein, for reducing a gearshift jolt when shifting from said single other gear to one of the sub-plurality of forward and reverse gears or from one of the sub-plurality of forward and reverse gears to said single other gear, said friction clutch is adapted to be closed.

2. The transmission of claim 1, wherein said other gear is the second forward gear.

3. The transmission of claim 1, wherein said friction clutch is arranged on said additional shaft and is adapted to connect a toothed wheel to said additional shaft, said toothed wheel being rotatably arranged on said additional shaft and being associated to said other gearwheel set of said other gear.

4. The transmission of claim 1, wherein said gearwheel sets include gearwheel sets for a first forward gear and a second forward gear and wherein for starting said vehicle from standstill the clutches associated to said first and to said second forward gear are adapted to be activated simultaneously.

5. The transmission of claim 1, wherein said separating clutch and said friction clutch are structurally integrated as one double clutch.

6. The transmission of claim 5, wherein said friction clutch cooperates with a hollow shaft of said double clutch, said hollow shaft and said additional shaft being interconnected via one of said gearwheel sets.

7. The transmission of claim 1, wherein said other gearwheel set of said other gear comprises a toothed wheel configured as a loose wheel arranged rotatably on said additional shaft, a clutch being provided for connecting said toothed wheel with said additional shaft.

8. The transmission of claim 7, wherein said clutch is configured as a gearshift clutch and is adapted to be actuated by means of a shift sleeve.

9. The transmission of claim 7, wherein said clutch is configured as a friction clutch.

10. The transmission of claim 1, wherein all of said loose wheels are arranged on said transmission output shaft.

11. The transmission of claim 10, wherein a toothed wheel of said other gearwheel set of said other gear is configured as a fixed wheel on said transmission output shaft.

12. The transmission of claim 10, wherein said gearwheel sets of said gears are arranged in a sequence fifth-sixth-second-fourth-third-first-reverse, as viewed from said transmission input shaft.

13. The transmission of claim 1, wherein a first plurality of said loose wheels is arranged on said transmission output shaft whereas a second plurality of said loose wheels is arranged on said countershaft.

14. The transmission of claim 13, wherein said gearwheel sets of said gears are arranged in a sequence fifth-sixth-second and third-fourth-first-reverse, as viewed from said transmission input shaft.

15. The transmission of claim 13, wherein said gearwheel sets of said other gear and of one of said sub-plurality of gears have one toothed wheel in common.

16. The transmission of claim 15, wherein said common toothed wheel is arranged on said transmission output shaft.

17. The transmission of claim 15, wherein said common toothed wheel is configured as a fixed wheel.

* * * * *

UNITED STATES PATENT AND TRADEMARK OFFICE
CERTIFICATE OF CORRECTION

PATENT NO. : 6,095,001
DATED : August 1, 2000
INVENTOR(S) : Gunter Ruehle and Martin Seufert It is certified that error appears in the above-identified patent and that said Letters Patent is hereby corrected as shown below:

Column 1, line 49, delete the second use of the word "is", insert the word --in--.

Column 3, line 16, delete the word "by" and insert --be--

Column 4, line 28, delete the word "on" and insert --in--

Column 6, line 58, delete the word "to" and insert --into--

Column 7, line 14, delete "20a" and insert --10a--

Column 7, line 27, delete the word "with" and insert --when--

Signed and Sealed this

Twenty-fourth Day of April, 2001

Attest:

NICHOLAS P. GODICI

Attesting Officer

Acting Director of the United States Patent and Trademark Office